United States Patent [19]

Fetty et al.

[11] Patent Number: 6,126,321
[45] Date of Patent: Oct. 3, 2000

[54] SHAFT JOURNAL BEARING AND SEAL WEAR RING ASSEMBLY

[75] Inventors: Mark W. K. Fetty, Hopewell; Paul A. Hubbard, Richmond, both of Va.

[73] Assignee: Brenco Incorporated, Petersburg, Va.

[21] Appl. No.: 09/371,125

[22] Filed: Jul. 16, 1999

[51] Int. Cl.[7] .................................................. F16C 33/78
[52] U.S. Cl. ........................................ 384/459; 384/477
[58] Field of Search .................................. 384/477, 484, 384/486, 551, 571, 584, 585, 589, 459

[56] References Cited

U.S. PATENT DOCUMENTS

| | | | |
|---|---|---|---|
| 2,703,738 | 3/1955 | Palmgren et al. | 384/459 |
| 2,977,138 | 3/1961 | Brittain, Jr. | 384/459 X |
| 3,494,682 | 2/1970 | Keller . | |
| 3,672,735 | 6/1972 | Keller et al. | 384/459 |
| 3,833,277 | 9/1974 | Jones et al. | 384/459 |
| 5,017,025 | 5/1991 | Williams . | |
| 5,380,102 | 1/1995 | Sink . | |
| 5,462,367 | 10/1995 | Davidson et al. . | |
| 5,549,395 | 8/1996 | Sink . | |
| 5,588,752 | 12/1996 | Fetty | 384/477 |

*Primary Examiner*—Thomas R. Hannon
*Attorney, Agent, or Firm*—Edward J. Brosius; F. S. Gregorczyk; Stephen J. Manich

[57] ABSTRACT

A bearing assembly for mounting on a journal at the end of a shaft employs a seal wear ring disposed between the backing ring and the end face of the axially inwardly directed bearing cone, with the outer cylindrical surface of the seal wear ring cooperating with a resilient sealing element for sealing the bearing. The inner diameter of the seal wear ring is greater than the diameter of the shaft journal to provide a clearance there between along the full length of the wear ring. Counterbores are provided in an outwardly directed surface of the backing ring and in the axially inwardly directed end face of the bearing cone, with the counterbores in the backing ring and bearing cone being dimensioned to provide an interference fit sufficient to provide a substantial radially compressive load in the ends of the seal wear ring upon assembly of the bearing. The seal wear ring may include an annular spacer ring of a dense, dimensionally stable synthetic resin material fitted within an annular recess on its inner surface, with the spacer ring having an internal diameter slightly less than the external diameter of the shaft journal and an outer diameter slightly greater than the inner diameter of the groove whereby when installed on the shaft journal, the spacer ring is under a radially compressive load.

20 Claims, 2 Drawing Sheets

SHAFT JOURNAL BEARING AND SEAL WEAR RING ASSEMBLY

BACKGROUND OF THE INVENTION

1. Field of the Invention

This invention relates to sealed shaft bearing assemblies and more particularly to an improved sealed bearing assembly employing a seal wear ring which substantially reduces or eliminates both journal fretting and cone back face wear.

2. Description of the Prior Art

Roller bearing assemblies incorporating two rows of tapered roller bearings preassembled into a self-contained package for mounting onto journals at the ends of axles or shafts are well known and used in a variety of applications. Since these bearings are widely used as rail car bearings assembled onto journals at the ends of rail car axles, the present invention will be described with reference to such rail car bearings, it being understood that the bearings may be employed on shaft journals for various other uses. In bearings of this type, the two rows of tapered roller bearing elements are fitted one into an outer race at each end of a common bearing cup, and a pair of bearing cones defining the inner races normally have an inner diameter dimension to provide an interference fit with the shaft journal. A cylindrical sleeve or spacer positioned between the cones provide an accurate spacing of the inner races on the journal. Seals mounted within each end of the bearing cup provide sealing contact with wear rings positioned one against the outer end faces of the bearing cones at each end of the assembly. The entire assembly is prelubricated and adapted to be pressed as a unit onto the end of the shaft journal.

In a typical rail car installation, the axle journal is machined with a fillet at the inboard end of the journal, and a backing ring is machined to accurately fit the contour of the fillet and engage the inboard end of the inner wear ring to accurately position the bearing assembly on the axle. An end cap mounted on the end of the axle by bolts threaded into bores into the axle engages the outboard wear ring and clamps the entire assembly on the end of the axle and applies an axial compressive load to the assembly between the fillet and the end cap. Examples of such bearings may be found, for example, in U.S. Pat. Nos. 3,494,682 and 5,380,102.

Bearings of the type described above are frequently subjected to high static and dynamic loading which results in flexure of the journal which in turn results in relative movement between the journal surface and the wear ring fitted thereon, and between the end face of the wear ring and the abutting end surface of the inboard bearing cone. As is well known, this relative movement can, over time, produce fretting resulting in a groove in the journal surface and an enlargement of the wear ring bore, and wear between the end of the wear ring and bearing cone may produce a groove in the cone face. This can result in the wear ring becoming so loose as not to maintain the desired axial clamping force on the assembly, or in the wear ring becoming so loose as not to remain perfectly concentric with the journal surface which, in turn, may ultimately produce seal failure.

One proposal to solve the journal fretting and end face wear problems is illustrated in U.S. Pat. No. 5,017,025 which discloses use of a seal wear ring having an internal diameter greater than the diameter of the journal to provide a space between the wear ring and the journal throughout the length of the wear ring. The backing ring is provided with a counterbore and a shoulder dimensioned to receive the end of the wear ring, with an inference fit, to align the wear ring relative to the axis of rotation. It has been found, however, that it is not always possible to obtain precise axial alignment when the bearing is installed, and further that when pressing the bearing onto the shaft, the end of the wear ring is not always precisely aligned with the counterbore and the backing ring so that the heavy pressing loads can mar the backing ring and/or shoulder which, in turn, can result in further misalignment. Even though journal fretting is eliminated by the absence of contact between the journal surface and wear ring, any misalignment can lead to excessive seal wear and ultimate failure, and to accelerated end face wear between the seal wear ring and bearing cone.

Occasionally during installation or removal of a bearing assembly, the weight of the backing ring and the interfitting wear ring will cover the inboard wear ring/backing ring assembly to fall out of the bearing. This can result in the loss and/or contamination of lubricant.

In older bearing designs, fretting was also common between the backing ring curved internal surface and the journal fillet surface since these parts moved relative to each other as a result of journal bending. In a railcar bearing installation, component compression at the 6 o'clock position caused the backing ring to move "up" or radially outward along the journal fillet surface. Conversely, release of the clamping load at the 12 o'clock position caused the backing ring to move "down" or radially inward and, of course, journal rotation continuously revolved these positions around the fillet, resulting in fretting around the periphery of the contacting curved surfaces. This problem was overcome by a change of the backing ring design which involved providing an axially extending flange which telescoped over a portion of the axle adjacent the maximum diameter portion of the fillet, with an interference fit sufficient to provide a preload or tensile stress in the backing ring during installation, which tensile stress must be relieved before compression at the 6 o'clock position (resulting from journal bending) can produce relative movement resulting in fretting. While this essentially eliminated the backing ring—fillet fretting problem, relative movement and fretting between the wear ring and the journal surface and between the wear ring and abutting cone face have not been previously successfully addressed.

U.S. Pat. No. 5,549,395 also illustrates a bearing arrangement in which the wear ring inner cylindrical surface is spaced from the journal surface along the full wear ring length. In this case, the coaxial relation between the wear ring and journal surface is maintained by a low friction dimensionally stable plastic ring interposed between the journal and wear ring inner surface. While this arrangement prolongs seal life, end face fretting is not entirely overcome.

U.S. Pat. No. 5,462,367 illustrates another arrangement for overcoming the problem of journal fretting by eliminating the seal wear ring entirely and providing an axial extension on the bearing cones which contact the resilient seal. This arrangement provides coaxial relation between the seal and the cylindrical sealing surface on the cone extension, but inherently requires the seal to be placed in close relation to the rolling elements. Pumping action of the rolling bearings, at high speed, and turbulence resulting from impact loadings and the like can result in undesired seal leakage.

It is also known that the interference fit between the wear ring and the recess in the backing ring results in little if any fretting at the interface between the wear ring and backing ring.

While the interference fit between the wear ring and the backing ring recess theoretically provides a coaxial relation between the wear ring outer surface and the journal axis, under no load or low load condition, journal bending can result in the sealing surface of the wear ring not being concentric with the journal at the point of seal contact. Thus, it has normally been considered desirable for the wear ring to contact the journal surface at least adjacent the bearing cones to provide a sealing surface that is concentric to the journal as shown, for example, in U.S. Pat. No. 3,494,682, mentioned above. The wear ring is dimensioned to provide an interference fit with the journal and this interference fit normally substantially eliminates journal fretting under light loads; however, under heavy loads encountered on today's rail cars, fretting still occurs between the wear ring and journal surface and also between the bearing cone end face and the end of the wear ring. Accordingly, it is an object of the present invention to provide a bearing design which includes a seal wear ring and which eliminates fretting between the wear ring and the journal surface and which substantially eliminates fretting between the wear ring and the bearing cone end face.

Another object of the invention is to provide such a bearing in which direct contact between the wear ring and the journal surface is avoided while maintaining the desired concentric relation between the wear ring surface and the journal axis.

Another object of the invention is to provide such a bearing including a seal wear ring which is maintained concentric with the shaft journal at each end of the wear ring without the necessity of contact with the journal surface.

Another object is to provide a preassembled, pre-lubricated bearing assembly in which the wear ring/backing ring subassembly is captured and cannot fall out of the bearing assembly.

SUMMARY OF THE INVENTION

In the attainment of the foregoing and other objects and advantages of the invention and in order to overcome the above disadvantages of the prior art shaft journal bearing assemblies, an important feature of the present invention resides in providing a seal wear ring having an inner surface spaced from the journal along the length of the wear ring and having its axially inner end received in an inference fitting relation, within a recessed seat in the bearing backing ring and having its other end received in an interference fitting relation within an axially extending bore formed in the end face of the bearing inner cone. The axially extending recesses in the backing ring and bearing cone provide substantially radially faced seats for the end surfaces of the wear ring, and the interference fits provided by the wear ring and the bearing cone provide a radially compressive force in the wear ring adjacent its end portions which is of sufficient magnitude to avoid relief due to normal journal bending and thereby eliminate relative movement between the wear ring and bearing cone end face to avoid fretting. By providing an interference fit at each end of the wear ring, the wear ring remains concentric with the journal axis so that non uniform loading of the seal is avoided.

In the event that the backing ring/wear ring/bearing cone subassembly start to fall out of the bearing, the seal case will engage the end face of the cone and prevent the subassembly from coming out of the bearing.

BRIEF DESCRIPTION OF THE DRAWINGS

Other features and advantages of the bearing assembly according to the present invention will be apparent from the detailed description contained herein below, taken in conjunction with the drawings, in which.

DESCRIPTION OF THE PREFERRED EMBODIMENT

Figure 1:
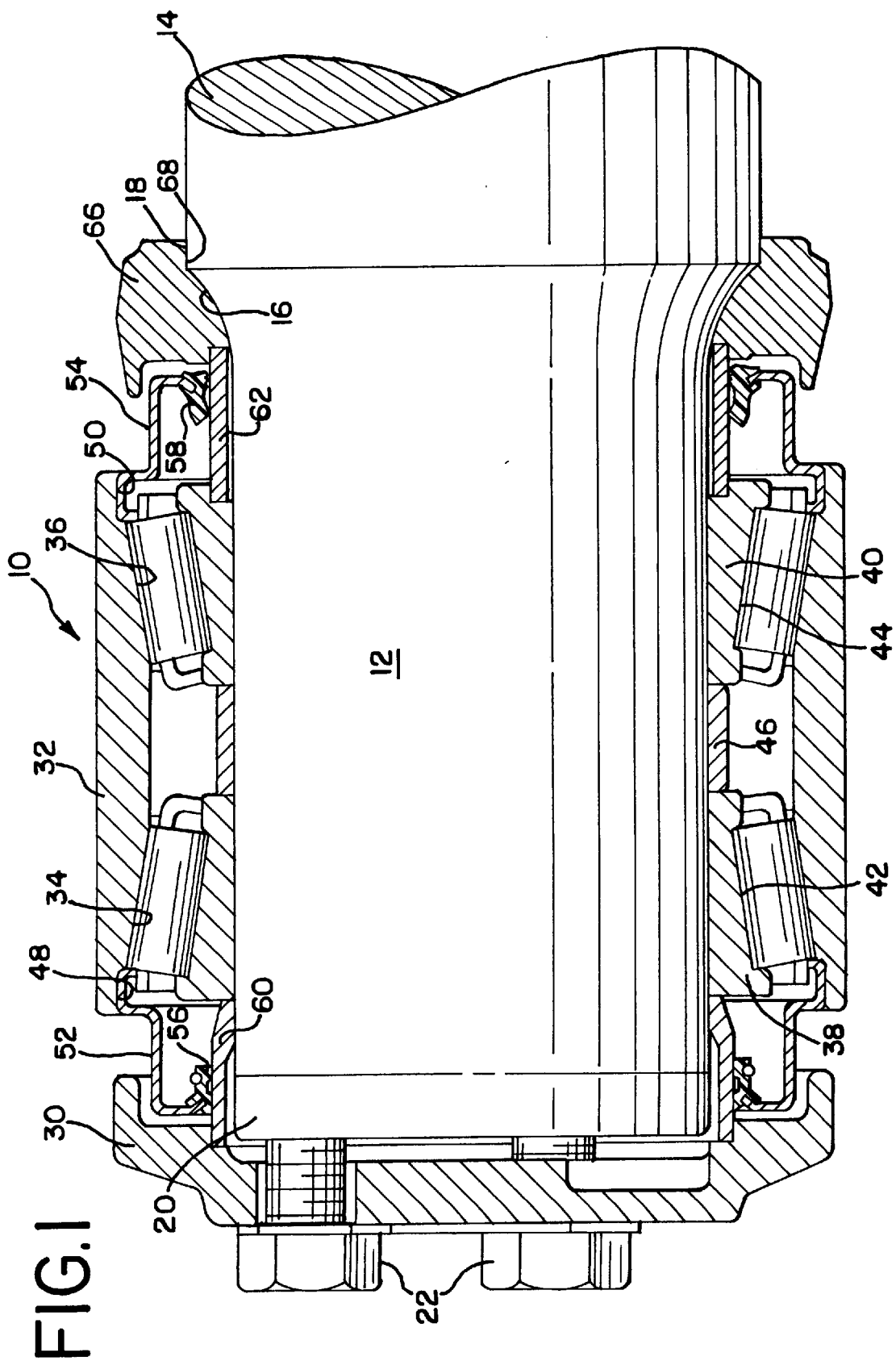
FIG. 1 is an elevation view, partially in section, of a tapered roller bearing assembly according to the present invention mounted on an axle journal.

Referring now to the drawings in detail, a bearing assembly indicated generally by the reference numeral 10 in FIG. 1 is shown mounted on a journal 12 on the free, cantilevered end of a shaft or axle 14, typically a rail car axle. Journal 12 is machined to very close tolerances and terminates at its axially inner end in a contoured fillet 16 leading to a cylindrical shoulder portion 18 of axle 14. At the free end of axle 14, journal 12 terminates in a slightly conical of tapered guide portion 20 dimensioned to facilitate installation of the bearing assembly onto the journal. A plurality of threaded bores (not shown) are formed in the end of axle 14 for receiving threaded cap screws, or bolts, 22 for mounting a bearing retaining cap 30 on the end of the shaft to clamp the bearing in position as described more fully herein below.

The bearing assembly 10 is preassembled and filled with lubricant before being mounted and clamped onto journal 12 by the cap 30. The bearing assembly includes a unitary bearing cup 32 having a pair of raceways 34, 36 formed one adjacent each end thereof which cooperate with a pair of bearing cones 38, 40 respectively forming the bearing inner races to support two rows of tapered bearings 42, 44, respectively. A center spacer 46 is positioned between cones 38, 40 to maintain the cones in accurately spaced relation relative to one another.

The bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 include resilient sealing elements 56, 58, respectively, which cooperate with and form a seal with a pair of sleeve-like seal wear rings 60, 62, respectively, having their inwardly directed ends in engagement with the outwardly directed ends of bearing cones 38, 40, respectively. The opposite end of wear ring 62 is received in a cylindrical counterbore 64 in the axially outwardly directed end of an annular backing ring 66 which, in turn, has a counterbore at its other end which is dimensioned to be received in interference relation on the cylindrical shoulder 18 of shaft 14.

Figure 2:
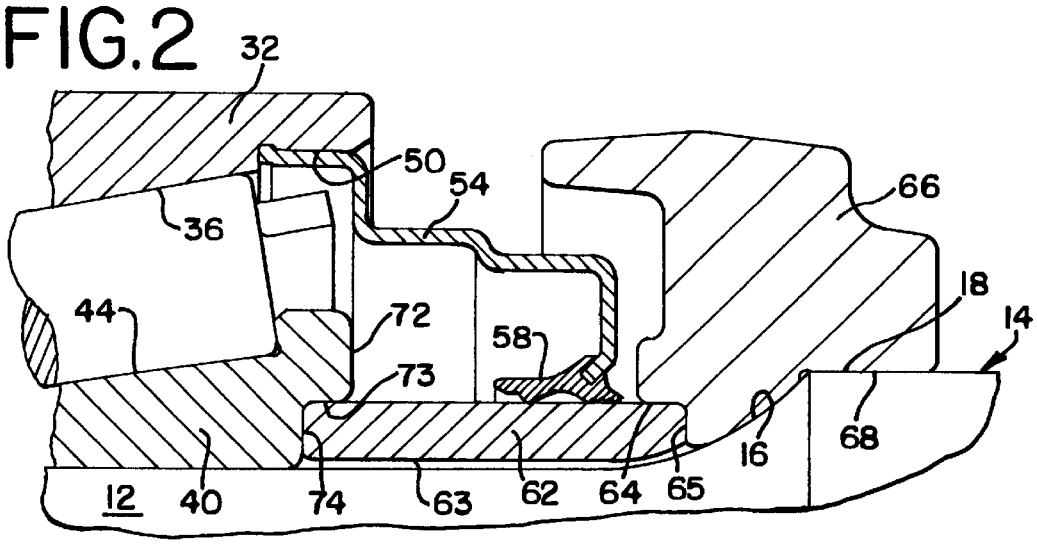
FIG. 2 is an enlarged fragmentary sectional view of a portion of the structure shown in FIG. 1.

The counterbore 64 and the outer diameter of wear ring 62 at its axially inwardly directed end are also dimensioned to provide an interference fit so that the wear ring must be pressed into the backing ring 66. Between counterbores 64 and 68, the backing ring is accurately machined to provide a contoured inner surface complimentary to and engaging the contoured fillet 16 at least in the area adjacent the shoulder 18 when the bearing assembly is mounted on the journal. The outwardly directed end of wear ring 60 bears against the retaining cap 30. In the embodiment of FIGS. 1 and 2, the counterbore 64 preferably terminates in a substantially radially disposed abutment surface 65 located closer to the radially smaller end of the fillet 16 than to the shoulder 18. As will be explained herein below with reference to FIG. 3, the axial location of the abutment surface of counterbore 64 relative to the fillet 16 will depend on the bearing configuration including the axial length of the overall bearing assembly.

In the prior art bearings of the type illustrated, for example, in U.S. Pat. No. 3,494,682, the wear rings typically have a stepped inner surface including a larger diameter portion providing a void space between the wear ring and the journal over a substantial portion of the wear ring length, and a smaller diameter portion which circumferentially contacts the journal to achieve an interference fit within prescribed tolerances. The relatively small portion of the wear ring contacting the journal surface was effective to center the wear ring with respect to the axis of rotation of the bearing for maintaining coaxial relation between the wear ring and the resilient sealing lips of the seal. As previously pointed out, however, flexing of the shaft journal frequently resulted in fretting between the wear ring and the contacting journal surface as well as end face wear between the contacting bearing cone and the contacting end of the inner wear ring.

In accordance with the present invention, both fretting and end face wear are substantially eliminated, and out of roundness at the area of seal contact with the wear ring outer surface is eliminated so that seal life is enhanced. This is accomplished by providing the axially inner seal wear ring 62 with an inner surface 63 spaced from the journal surface along the entire length of the wear ring and by radially fixing each end of the seal wear ring in concentric relation relative to the journal surface. The conventional press fit is provided between the axially inwardly directed end of wear ring 62 within the counterbore 64, with the interference fit providing a high radially compressive load in the end of the wear ring. Similarly, the end face 72 of inner cone 40 is provided with a counterbore 73 terminating in a radial face 74 for abutting the adjacent end face of the wear ring 62, with the cylindrical bore surface 73 dimensioned to receive the outer cylindrical surface portion of the wear ring 62 in interference relation, again, with the interference being such as to provide a substantial radial compressive force in the end portion of the wear ring received within the counterbore in cone 40. Since the inner diameter of cone 40 is dimensioned to provide an interference fit with the surface of journal 12, installing the cone on the journal will produce stresses causing a slight increase in diameter of the cone and consequently of the counterbore 73. The initial radial compression load in the end portion of the wear ring as a result of the interference fit in counterbore 73 must therefore be sufficiently high as to retain the desired compression load after installation. At the same time, it is essential that the interference fit not be sufficiently great, after installation, to cause distortion of the bearing cone in the area of the bearing race.

The axial depth of the counterbores 64 and 73 are such that the interference fit with the ends of the wear ring 62 provide sufficient frictional resistance so that normal flexing of the journal will not result in relative movement. Preferably, this depth should be from about one-half up to about the full radial wall thickness of the end portions of the wear ring received therein. It is desirable, however, that the counterbore in the cone 40 not extend to a depth to undercut the bearing racing.

When the preassembled and prelubricated bearing assembly 10 is mounted on the axle journal with the axial compressive load prescribed for the bearings, for example, in the case of a railroad wheel bearing, the standard loading specified by the American Association of Railroads, the interference fit between the cones 38 and 40 will result in a substantially axial compressive load being retained as described, for example, in U.S. Pat. No. 5,380,102. When the end cap 30 is installed, with the proper torque on the cap screws, the compressive axial load will be retained in the entire bearing assembly between the cap 30 and the backing ring 66. Further, the backing 66 will be subjected to a substantial hoop tensile load as a result of the interference fit between the counterbore 68 and the shoulder 18 so that relative movement between the contoured fillet surface and the correspondingly contoured backing ring surface as a result of journal flexure is eliminated.

In the same manner that the interference fit between the backing ring and axle shoulder creates a hoop tensile force that has to be relieved before bending can produce relative movement between the backing ring and journal, the radially compressive loads imposed upon the ends of the wear ring by the interference fit within the counterbores in the backing ring and the cone face will resist relative movement between these components. Thus, by providing sufficient preload in the form of radial compressive forces in the end portions of the wear ring, relative movement between the end of the wear ring and the cone is eliminated and fretting or end face wear is substantially avoided. At the same time, since the inner surface of the wear ring is spaced from the journal surface, no journal fretting can occur.

It is recognized, of course, that dynamic loads imposed on a rail car bearing as a result of a heavily loaded rail car moving at high speeds over an uneven track may under certain impact or dynamic loading conditions produce journal flexure in excess of that required to overcome the compressive preload and consequently slight relative movement between the wear ring and cone end face may occur for brief instances. However, the compressive preload can be maintained sufficiently high as to avoid such relative movement during normal operations so that end face wear is essentially eliminated.

Figure 3:
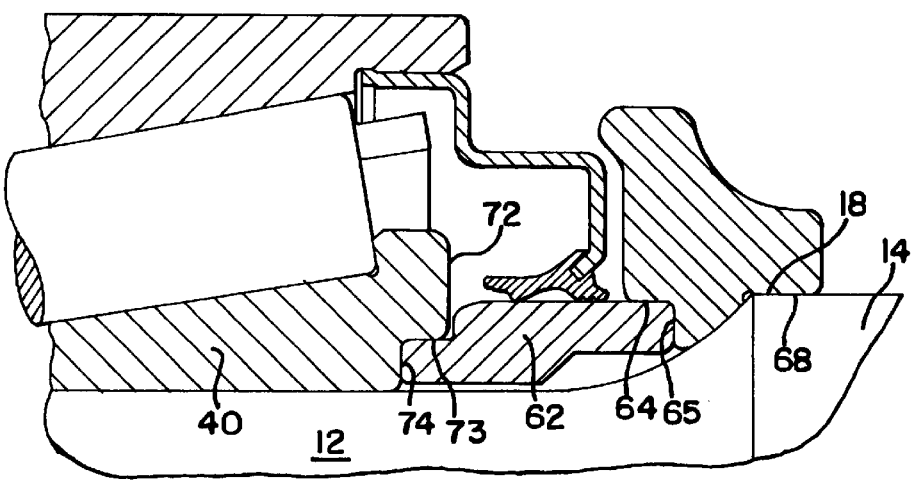
FIG. 3 is a view similar to FIG. 2 showing an alternate embodiment of the invention.

Referring now to FIG. 3, an alternate embodiment of the invention is illustrated in a shorter version of the bearing assembly of the type currently enjoying increased usage in the railway industry. Since the basic construction and operation of the embodiment in FIG. 3 is essentially the same as that described above with respect to FIGS. 1 and 2, like reference numbers are applied to corresponding parts of the two embodiments. Thus, in FIG. 3, the wear ring 62 is illustrated as being substantially shorter, in axial length, than the corresponding wear ring of FIGS. 1 and 2, and has its axially inner end received in interference relation in counterbore 64 in the backing ring and its opposite or axially outer end received in interference relation in the counterbore 68 in the end face 72 of cone 40. In such short bearing arrangements, it is conventional for the backing ring not to extend down along the fillet for as great an axial distance and therefore in this embodiment the wear ring is constructed in a "stepped" configuration with the inner surface having a smaller diameter over substantially half its length closest the cone and a larger diameter over the remainder of its length, i.e., the portion closer to the backing ring. Similarly, the outer surface of the wear ring is stepped, or smaller adjacent the cone and larger adjacent the backing ring. Preferably the wear ring 62 of the FIG. 3 embodiment has a central portion that is of greater radial thickness than the end portions, thereby providing a greater resistance to bending. In this short bearing embodiment the abutment surface 65 may be located about the same distance from the shoulder 18 and the small diameter end of the fillet. Operation of the embodiment of FIG. 3, insofar as eliminating end face wear, is identical to that described above.

Figure 4:
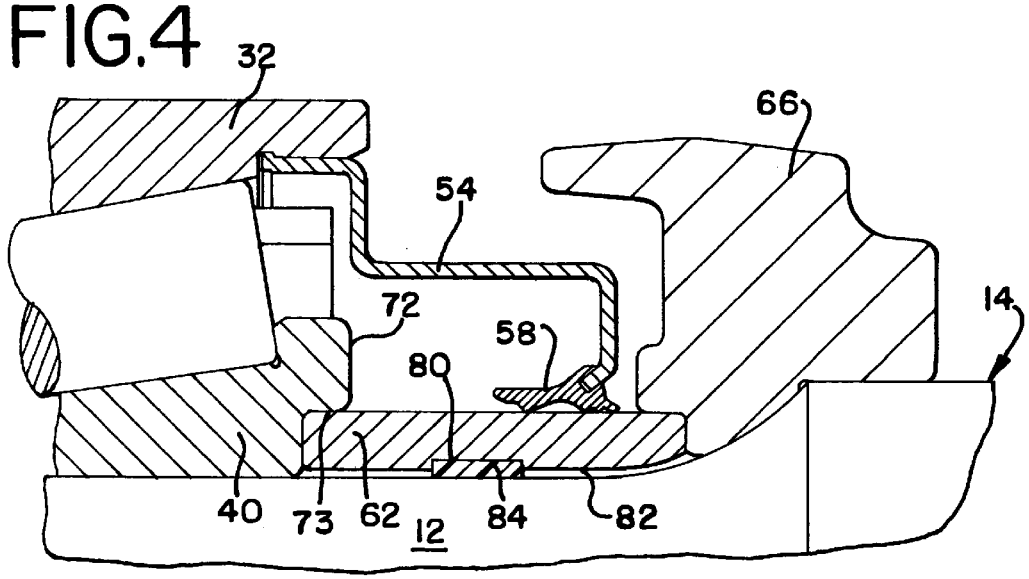
FIG. 4 is a view similar to FIGS. 2 and 3 showing a further embodiment of the invention.

The embodiment of the invention illustrated in FIG. 4 employs an inner seal wear ring having overall dimensions similar to the wear ring 62 of the embodiment shown in FIGS. 1 and 2, and again, since the basic construction and function of the various embodiments are similar, like reference numerals are employed to designate corresponding parts in the various views. Thus, in FIG. 4, the wear ring 62 is shown as having its axially inner end received in interference relation in the counterbore 64 of backing ring 66, and its opposite end received in interference relation within the counterbore 73 in the end face 72 of cone 40 in the same manner described above with references to FIGS. 1–3. In this FIG. 4 embodiment, however, an annular groove or recess 80 is formed in the inner surface 82 of wear ring 62, preferably at a location about equally spaced from its opposite ends, and an annular spacer ring 84 of dimensionally stable, low friction synthetic resin material such as polyvinylchloride is mounted within the groove 80. The outer circumference of the spacer ring 84 has a diameter which is slightly greater than the diameter of groove 80 so that, when the spacer ring is installed within the groove, the spacer ring is under a slight compressive load. The depth of groove 80 is such that the spacer ring may be inserted into the seal wear ring by pressing operation, and telescoped along the inner surface of the seal wear ring until it snaps into the groove 80.

The inner diameter of spacer ring 84 is slightly less than the outer diameter of journal 12 so that, when the spacer ring and seal wear ring are assembled, the spacer ring provide an interference fit on the journal. Thus, once installed, the spacer ring 84 remains under a compressive load between the journal surface 12 and the inwardly directed cylindrical surface of groove 80. This compressive load tends to prevent distortion of the wear ring 62 under bending loads, thereby further extending seal life.

While preferred embodiments of the invention have been illustrated and described, it is understood that the invention is not limited to the illustrated embodiments, but rather that it is intended to include all embodiments of the invention which would be apparent to one skilled in the art and which come within the spirit and scope of the invention.

What is claimed is:

1. A shaft and bearing assembly for supporting a structure for relative rotation about the longitudinal axis of the shaft, the shaft having a free end, a shoulder spaced from the free end, and a journal of a diameter smaller than the diameter of the shoulder and extending from the free end toward the shoulder and terminating in a contoured fillet leading to the shoulder, a backing ring fitted around the journal at the fillet, the backing ring including a first axially extending counterbore receiving the shaft shoulder in interference relation and a second axially extending counterbore directed toward the shaft free end and providing a first substantially radially extending annular abutment surface directed toward said free end, an end cap member mounted on the shaft free end providing a second abutment surface directed toward said shoulder, and a bearing assembly mounted on the journal between the first and second abutment surfaces, the bearing assembly including a bearing cup having a pair of axially spaced outer bearing races presented inwardly toward the shaft axis, first and second bearing cones mounted on said journal in interference relation therewith, said bearing cones each having a generally radially extending end face and an inner bearing race presented outwardly one toward each of the outer bearing races, two rows of rolling elements arranged one between each inner race and the opposing outer race, a first annular seal wear ring mounted adjacent said free end and having opposed ends one abutting the second abutment surface and the other abutting said first bearing cone end face, and a second annular seal wear ring interposed between said backing ring and the second bearing cone, a pair of seals mounted on said bearing cup and cooperating one with each said seal wear ring to close the ends of the annular space between the inner and outer bearing races, a third axially extending counterbore, said third counterbore being formed in the end face of said second bearing cone and terminating in a third abutment surface directed toward and in opposing relation to said first abutment surface, said second annular seal wear ring having a first end received in interference relation in said second counterbore in said backing ring and in abutting relation with said first abutment surface and a second end received in interference relation in said third counterbore and in abutting relation with said third abutment surface, said second annular seal wear ring having an inner surface extending in outwardly spaced relation to said journal surface along the full length of the seal wear ring.

2. The invention defined in claim 1 wherein the axial depth of said second and said third counterbores is at least substantially equal to one half the radial thickness of the end portion of said second seal wear ring telescopingly received in the respective second and third counterbores.

3. The invention defined in claim 2 wherein the axial depth of said second and said third counterbores are within the range of from about one half to about the full thickness of the end portion of the second seal wear ring telescopingly received in the respective second and third counterbores.

4. The invention defined in claim 3 wherein said second annular seal wear ring has a substantially cylindrical outer surface.

5. The invention defined in claim 4 wherein said first abutment surface is located closer to the small end of said fillet than to said shoulder.

6. The invention defined in claim 4 further comprising an annular spacer ring of dense, dimensionally stable, low friction synthetic resin material mounted within said second seal wear ring and engaging said journal surface, and spacer ring being dimensioned to provide an interference fit with said journal surface and said seal wear ring.

7. The invention defined in claim 3 wherein said second counterbore has a diameter greater than the diameter of said third counterbore, and wherein the end portion of said second seal wear ring received in said second counterbore has an outer diameter greater than the outer diameter of the end portion received in said third counterbore.

8. The invention defined in claim 7 wherein said second annular seal wear ring includes a portion intermediate its end portions which is of greater radial thickness than the portion adjacent its respective end portions.

9. The invention defined in claim 7 wherein said first abutment surface is spaced axially from said shoulder a distance substantially equal to one-half the axial length of said fillet.

10. The invention defined in claim 1 wherein the interference fit between said second bearing cone and said journal surface and the interference fit between said third counterbore and said second end of said second seal wear ring are such that, when the bearing assembly is mounted on the journal, a radially compressive load is retained in said second end portion of said second seal wear ring.

11. The invention defined in claim 1 wherein the interference fit between said second and third counterbores and the end portions of said second annular seal wear ring received therein is such that, when the bearing is mounted on the shaft journal, a compressive force is applied to the end portions of the seal wear ring, said compressive force being of a magnitude at least substantially as great as any tensile load applied to the seal wear ring as a result of bending forces encountered by the shaft journal during normal operation.

12. In combination with an axle having a shoulder spaced from a free end and a journal of a diameter smaller than that of the shoulder extending from the free end and terminating in a contoured fillet leading to the shoulder, an improved bearing assembly fitted onto the journal and retained thereon by an end cap mounted on the free end to permit relative rotation between the axle and an element supported by the bearing, said bearing assembly comprising an inboard bearing cone and an outboard bearing cone mounted on said journal in axially fixed relation to one another, each said bearing cone defining a radially outward directed, tapered inner raceway and each having an inner diameter providing an interference fit with said journal, a bearing cup defining a pair of axially spaced, inwardly directed tapered outer raceways located one in radially outwardly spaced, opposed relation to each said inner raceway, rolling elements located between the inner and outer raceways, a backing ring having a first counterbore therein receiving said shoulder in interference relation and including a contoured surface engaging the fillet surface at least in the area adjacent said shoulder to radially and axially fix the backing ring on the axle, a first annular seal wear ring having a first end engaging said cap and a second end engaging an end face surface on said outboard bearing cone and a second annular seal wear ring mounted between an engaging said backing ring and said second bearing cone, said backing ring having a counterbore formed therein receiving a first end of said second annular seal wear ring in interference relation, and said second bearing cone having a counterbore formed therein receiving the second end of said second seal wear ring in interference relation.

13. The invention defined in claim 12 wherein said second seal wear ring has an inner surface spaced from said journal along the full length of said second seal wear ring.

14. The invention defined in claim 13 wherein the axial depth of said second and said third counterbores is at least substantially equal to one half the radial thickness of the end portion of said second seal wear ring telescopingly received in the respective second and third counterbores.

15. The invention defined in claim 14 further comprising an annular spacer ring of dense, dimensionally stable, low friction synthetic resin material mounted within said second seal wear ring and engaging said journal surface, and spacer ring being dimensioned to provide an interference fit with said journal surface and said seal wear ring.

16. The invention defined in claim 14 wherein the axial depth of said second and said third counterbores are within the range of from about one half to about the full thickness of the end portion of the second seal wear ring telescopingly received in the respective second and third counterbores.

17. The invention defined in claim 16 wherein said second counterbore has a diameter greater than the diameter of said third counterbore, and wherein the end portion of said second seal wear ring received in said second counterbore has an outer diameter greater than the outer diameter of the end portion received in said third counterbore.

18. The invention defined in claim 17 wherein said second annular seal wear ring includes a portion intermediate its end portions which is of greater radial thickness than the portion adjacent its respective end portions.

19. The invention defined in claim 16 wherein said second annular seal wear ring has a substantially cylindrical outer surface.

20. The invention defined in claim 19 wherein the interference fit between said second bearing cone and said journal surface and the interference fit between said third counterbore and said second end of said second seal wear ring are such that, when the bearing assembly is mounted on the journal, a radially compressive load is retained in said second end portion of said second seal wear ring.

* * * * *